United States Patent Office 3,810,761
Patented May 14, 1974

3,810,761
DYES FOR PHOTOGRAPHY
Joseph Bailey, Harrow Middlesex, and Edward B. Knott, Bushey Heath, England, and Peter A. Marr, Rochester, N.Y., assignors to Eastman Kodak Company, Rochester, N.Y.
No Drawing. Application Jan. 15, 1971, Ser. No. 106,893, now Patent No. 3,758,309, which is a continuation-in-part of abandoned application Ser. No. 778,333, Nov. 22, 1968. Divided and this application Dec. 7, 1972, Ser. No. 313,078
Claims priority, application Australia, Oct. 16, 1968, 44,870, 44,871; Belgium, Nov. 25, 1968, 66,581; Canada, Nov. 25, 1968, 35,997, 35,998; France, Nov. 25, 1968, 175,097; Germany, Nov. 25, 1968, 10,462
Int. Cl. G03c 1/84
U.S. Cl. 96—84 R                              19 Claims

ABSTRACT OF THE DISCLOSURE

Dyes derived from 1H-pyrazolo[3,2-c]-s-triazoles are advantageously used in photographic silver halide elements as light-absorbing dyes for filter layers.

---

This application is a division of U.S. Ser. No. 106,893, filed Jan. 15, 1971, now Pat. No. 3,758,309, which in turn was a continuation-in-part of U.S. Ser. No. 778,333, now abandoned.

The present invention relates to photography, including color photography, light-sensitive photographic emulsions containing a dye derived from a 1H-pyrazolo[3,2-c]-s-triazole and light-sensitive elements in which at least one layer contains a dye derived from a 1H-pyrazolo[3,2-c]-s-triazole.

It is known that certain methine dyes, including certain cyanine dyes and certain merocyanine dyes are useful in photographic elements as silver halide sensitizer and/or as light-filtering dyes. Dyes that spectrally sensitize silver halide emulsions are particularly valuable for use in color photography to differently sensitize the emulsion layers so they will record light from the desired parts of the visible spectrum. Color photographic elements usually comprise a support coated with an emulsion sensitive to light from the red region of the spectrum, an emulsion sensitive to light from the green region of the spectrum and an emulsion that is sensitive to light from the blue region of the spectrum. The layers may be arranged in various orders, however, one conventional arrangement is to have the red-sensitive layer coated on the support with the green-sensitive layer coated next, and the blue-sensitive layer outermost, usually with a bleachable blue light-absorbing filter layer coated the between the green- and blue-sensitive layers. In addition to the bleachable blue light-absorbing filter layer, other light-absorbing layers are used, either over, between or under one or more of the light-sensitive layers.

Dyes must have not only the desired sensitizing characteristics and/or light-absorbing characteristics but be readily soluble preferably in aqueous media for ease in sensitizing a photographic emulsion and also for ease in removal from the emulsion layers during photographic processing so that a minimum of stain is produced in the resulting photograph. There is a continuing search for new dyes to fill the needs for sensitizing and light-absorbing dyes for photography.

It is therefore an object of our invention to provide a novel class of dyes derived from a 1H-pyrazolo[3,2-c]-s-triazoles of the indicated type that are valuable for use in photography as sensitizing dyes and/or light-filtering dyes.

Another object of our invention is to provide a novel hydrophilic colloid silver halide emulsion containing one of our methine dyes.

Another object of our invention is to provide a novel photographic element comprising a support, at least one silver halide emulsion layer and at least one layer containing a methine dye derived from a 1H-pyrazolo[3,2-c]-s-triazole.

Still other objects will be apparent from a consideration of the following specification and claims.

These and still other objects are accomplished according to our invention by the preparation and use of our novel dyes derived from a 1H-pyrazolo[3,2-c]-s-triazole. Our dyes have two nuclei, at least one of them being a 1H-pyrazolo[3,2-c]-s-triazole nucleus attached at the carbon atom in the 7 position of this nucleus through a double bond or by a methine linkage to a second nucleus to complete the dye, such as, a second 1H-pyrazolo[3,2-c]-s-triazole nucleus, a heterocyclic basic nucleus having from 5 to 6 atoms in the heterocyclic ring in which nitrogen, oxygen, sulfur and selenium are the heteroatoms with at least one of the heteroatoms being nitrogen, including any of the well-known heterocyclic nuclei found in cyanine dyes or an acidic heterocyclic ketomethylene nucleus having from 5 to 6 atoms in the heterocyclic ring with heteroatoms such as nitrogen, oxygen, sulfur and selenium, including any of the well-known acidic heterocyclic ketomethylene nuclei found in merocyanine dyes.

In one embodiment of our invention, our methine dyes have two 1H-pyrazolo[3,2-c]-s-triazole nuclei connected to each other through the carbon atom in the 7 position of the nuclei by a conjugated methine linkage having an odd number of from 1 to 5 (i.e., 1,3 or 5) carbon atoms in the linkage.

In another embodiment of our invention, our dyes have a 1H-pyrazolo[3,2-c]-s-triazole nucleus attached at the carbon atom in the 7 position of this nucleus through a double bond or a methine linkage to a carbon atom in a second nucleus that is a heterocyclic basic nucleus having from 5 to 6 atoms in the heterocyclic ring such as are found in cyanine dyes.

In another embodiment of our invention, our dyes have a 1H-pyrazolo[3,2-c]-s-triazole nucleus attached at the carbon atom in the 7 position of this nucleus by a conjugated methine linkage having an odd number of from 1 to 5 (i.e., 1, 3 or 5) carbon atoms in the linkage, to a carbon atom in a second nucleus that is an acidic heterocyclic ketomethylene nucleus having from 5 to 6 atoms in the heterocyclic ring, including any of the acidic heterocyclic ketomethylene nuclei found in merocyanine dyes.

The dyes of our invention are derived from a 1H-pyrazolo[3,2-c]-s-triazole advantageously represented by the formulas:

I. 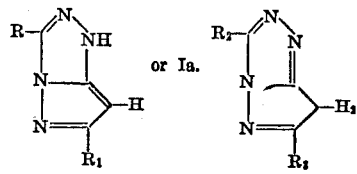

or Ia.

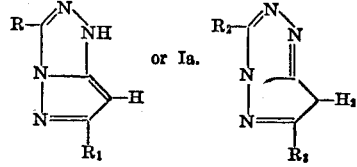

wherein R, $R_1$, $R_2$ and $R_3$ each represent the same or a different group, such as, a hydrogen, an alkyl group that is straight chain or branched chain, preferably having from 1 to 22 carbon atoms and unsubstituted or substituted, such as, methyl, ethyl, n-propyl, isopropyl, sec. butyl, t-butyl, t-amyl, hexyl, 2-chlorobutyl, 2-hydroxyethyl, 2-phenylethyl, 2-(2,4,6-trichlorophenyl)ethyl, etc.; an aryl group that is unsubstituted or substituted, in which the aryl group is a naphthyl group, e.g., α-naphthyl, β-naphthyl, 2-chloro-γ-naphthyl, 2-methoxynaphthyl, etc., a phenyl group (e.g., 4-methylphenyl, 2,4,6-trichlorophenyl, 3,5-dibromophenyl, 2-, 3-, 4-trifluoromethylphenyl, etc., a heterocyclic group having from 5 to 6 atoms in the ring, e.g., a pyridyl group, a thienyl group, a quinolyl group, and furyl group etc.; amino; substituted amino, e.g., methylamino, diethylamino, n-docosylamino, phenylamino, tolylamino, 4-(3-sulfobenzamino)anilino, 4 - cyanophenylamino, 2 - trifluoromethylphenylamino, benzothiazoloamino, etc.; acylamido radicals, e.g., ethylcarbonamido, butylcarbonamido, phenylethylcarbonamido, phenylcarbonamido, 2,4,6-trichlorophenylcarbonamido, 4-methylphenylcarbonamido, 2-ethoxyphenylcarbonamido, 2-[(2,4-di - tert - amylphenoxy) acetamido]benzamido, γ- or β-naphthylcarbonamido, etc.; hydroxy; an alkoxy group, e.g., methoxy, ethoxy, n-butoxy; n-hexoxy, etc.; carboxy; an esterified carboxy radical, such as, a

group; $R_5$ represents an alkyl group (e.g., methyl, ethyl, butyl, etc.) or an aryl group (e.g., phenyl, tolyl, ethylphenyl, chlorophenyl, etc.; R and $R_{1-3}$ being additionally and individually defined as an alkylthio group wherein the alkyl moiety usefully contains 1–20 carbon atoms, particularly lower alkyl exemplified by methyl and octyl.

IIa.

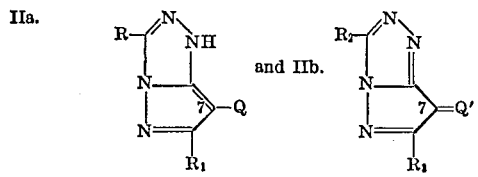

and IIb.

wherein R, $R_1$, $R_2$ and $R_3$ are as defined previously, while Q and Q' represent the atoms necessary to complete the chromophoric system. Q, for example, represents a

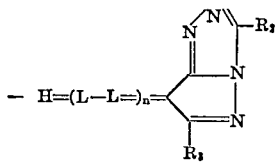

a

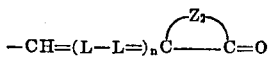

group, etc., and Q', for example, represents a

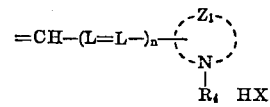

group, a

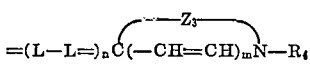

group, etc., wherein L represents a methine group (e.g., —CD= where D represents hydrogen, a lower alkyl group, such as, methyl, ethyl, butyl, etc., and an aryl group such as phenyl, tolyl, naphthyl, etc.) such that not more than one L group contains a D group other than hydrogen; n represents an integer of from 0 to 2; $R_2$ and $R_3$ are as described previously; $Z_1$ represents the atoms necessary to complete a heterocyclic basic nucleus having from 5 to 6 atoms in the heterocyclic ring such as those conventionally employed in cyanine dyes, especially including 2-pyrrole, 3-pyrrole, 2-indole, 3-indole, 1-indolizine, 3-indolizine, etc.; $Z_2$ represents the atoms necessary to complete an acidic heterocyclic ketomethylene nucleus having from 5 to 6 atoms in the heterocyclic ring conventionally employed in merocyanine dyes, such as, a hydantoin nucleus (e.g., hydantoin, 3-alkyl (e.g., ethyl, propyl, etc.) hydantoin, 3-phenyl or 3-α-naphthyl hydantoin, 1,3-dialkyl (e.g., 1,3-diethyl, etc.) hydantoin, 1-alkyl-3-aryl (e.g., 1-methyl-3-phenyl, 1-methyl-3-naphthyl, etc.) hydantoin, 1,3-diphenyl hydantoin, etc., a thiohydantoin nucleus (e.g., 2-thiohydantoin, 3-methyl-2-thiohydantoin, 1,3-diethyl - 2 - thiohydantoin, 1,3-diphenyl-2-thiohydantoin, 1-ethyl-3-phenyl-2-thiohydantoin, etc.), a rhodanine nucleus (e.g., rhodanine, 3-ethylrhodanine, 3-phenylrhodanine, 3-α-naphthylrhodanine, 3-(1-benzothiazyl)rhodanine, etc.), a barbituric acid nucleus (e.g., barbituric acid, 1-ethyl barbituric acid, 1,3-diethyl barbituric acid, etc.), a thiobarbituric acid nucleus (e.g., 2-thiobarbituric acid, 1-propyl-2-thiobarbituric acid, 1-phenyl-2-thiobarbituric acid, 1,3-diethyl-2-thiobarbituric acid, etc.), a 2-thiazolin-4-one nucleus (e.g., 2-thiazolin-4-one, 3-methyl-2-thiazolin-4-one, etc.), a 2-thio-2,4-oxazolinedione nucleus (e.g., 2-thio-2,4-oxazolinedione, 3-ethyl-2-thio-2,4-oxazolidinedione, etc.), an imidazolone nucleus (e.g., 2-imidazolin-4-one, etc.), a 2-pyrazolin-5-one nucleus (e.g., 2-pyrazolin-5-one, 1-phenyl-2-pyrazolin-5-one, 3-anilino-2-pyrazolin-5-one, etc.), an indandione nucleus (e.g., indandione, etc.), etc.; $Z_3$ represents the nonmetallic atoms required to complete a 5 to 6 membered heterocyclic basic nucleus of the type found in cyanine dyes, such as, a thiazole nucleus (e.g., thiazole, 4-methyl thiazole, 4-phenylthiazole, 5-methylthiazole, 5-phenylthiazole, 4,5 - dimethylthiazole, 4,5 - diphenylthiazole, 4-(2-thienyl) thiazole, etc.), a benzothiazole nucleus (e.g., benzothiazole, 4-chlorobenzothiazole, 5-chlorobenzothiazole, 6 - chlorobenzothiazole, 7 - chlorobenothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5 - hydroxybenzothiazole, 6 - hydroxybenzothiazole, etc.), a naphthothiazole nucleus (e.g., α-naphthothiazole, β-naphthothiazole, 5-methoxy-α-naphthothiazole, 5-ethoxy - α - naphthothiazole, 8-methoxy-β-naphthothiazole, 7-methoxy α-naphthothiazole, etc.), a thionaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6 - dimethylbenzoxazole, 5 - methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., α-naphthoxazole, β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), a 2-pyridine nucleus (e.g., 2-pyridine, 5-methyl-2-pyridine, etc.), a 4-pyridine nucleus (e.g., 4-pyridine, 3-methyl-4-pyridine, etc.), a 2-quinoline nucleus (e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, etc.), a 4-quinoline nucleus (e.g., 4-quinoline, 6-methoxy-4-quinoline, 7-methyl-4-quinoline, 8-chloro-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3,3-dimethylindolenine, 3,3,5-trimethylindolenine, 3,3,7-trimethylindolenine, etc.), an imidazole nucleus (e.g., imidazole, 1-alkylimidazole, 1-alkyl-4-phenylimidazole, 1-alkyl - 4,5 - dimethylimidazole, etc.), a benzimidazole nucleus (e.g., benzimidazole, 1-alkylbenzimidazole, 1-aryl-5,6-dichlorobenzimidazole, etc.), a naphthimidazole nucleus (e.g., 1-alkyl-α-naphthimidazole, 1-aryl - β - naphthimidazole, 1-alkyl-5-methoxy-3-naphthimidazole, etc.), etc; $R_4$ represents an alkyl group (e.g., methyl, ethyl, sulfoethyl, carboxyethyl, propyl, butyl, etc.) and a phenyl group (e.g., phenyl, tolyl, etc.); and X represents an acid anion (e.g., $Cl^-$, $Br^-$, $I^-$, $HSO_4^-$, $C_2H_5SO_4^-$, $p\text{-}CH_3C_6H_4CO_3^-$, $ClO_4^-$, $BO_3^-$, $SCN^-$, etc.) and $m$ is 1 or 2.

Our dyes are still further represented by the dyes of Formulas III, IV, VI and VIII which are described herein below.

Dyes of Formula III:

III.

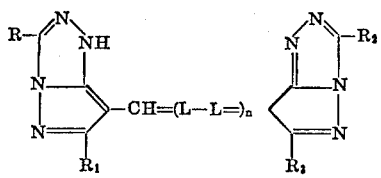

wherein R, $R_1$, $R_2$, $R_3$, L, and $n$ are as described previously, are advantageously prepared by condensation of 2 moles of a compound of Formula I with one mole or ethyl orthoformate (monomethines), β-ethoxyacroleinacetal (trimethines), or glutaconic aldehyde dianilide hydrochloride (pentamethines). Dyes of Formula III are advantageously used to spectrally sensitize photographic silver halide emulsions.

Dyes of Formula IV.

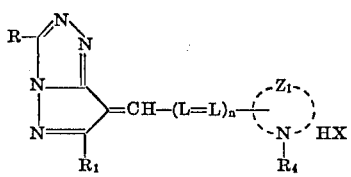

wherein R, $R_1$, L, $n$, $Z_1$, $R_4$ and X are as defined previously, are advantageously prepared by reaction of a compound of Formula Ia with a compound of the Formula V:

V.

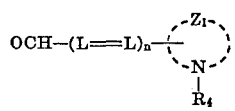

wherein L, $n$, $Z_1$ and $R_4$ are as defined in the presence of an acid IIX. These dyes are advantageously used as filter dyes which are bleachable in photographic developer solutions.

Dyes of the Formula VI.

VI.

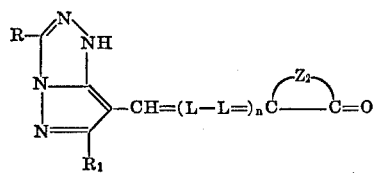

wherein R, $R_1$, L, $n$ and $Z_2$ are as defined previously, are advantageously prepared by reaction of a compound of Formula I with a compound having the Formula VII:

VII.

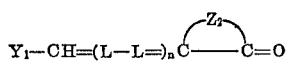

wherein $Y_1$ is alkoxy or acetanilido. Dyes of Formula VI are advantageously used to spectrally sensitize photographic silver halide emulsions.

Dyes of the Formula VIII:

VIII.

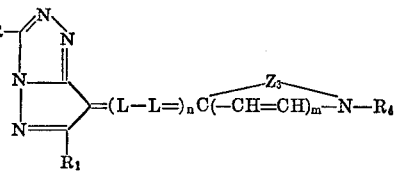

wherein R, $R_1$, L, $n$, $R_4$ and $Z_3$ are as defined previously, are advantageously prepared by reaction of a compound of Formula Ia with a compound of the Formula IX:

IX.

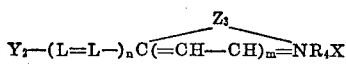

wherein $Y_2$ is iodine, ethylthio, or an acetanilido radical. Dyes of Formula VIII are advantageously used as spectral sensitizers for silver halide emulsions.

The compounds of Formulas I and Ia are advantageously prepared by heating the appropriate 7-alkoxycarbonyl-1H-pyrazolo-[3,2-c]-s-triazolo (substituted or not on the carbon atoms in the 3 and 6 positions on the ring) in sulfuric acid to remove the 7-alkoxycarbonyl group by hydrolysis. The 7-alkoxycarbonyl-1H-pyrazolo [3,2-c]-s-triazoles are advantageously prepared by adding a solution of bromine in glacial acetic acid to a mixture of benzaldehyde 4-ethoxycarbonyl-3-methylpyrazol-5-yl hydrazone [H. Beyer et al., Ber. 89, 2552 (1956)] or by acylation of the appropriate 4-ethoxycarbonylpyrazol-5-yl hydrazine with the appropriate acid chloride or acid anhydride while heating, after which the acylated compound is heated under reflux with a dry inert solvent, such as, benzene, toluene, etc., and phosphorous oxychloride to cause ring closure and formation of the desired 7-alkoxycarbonyl - 1H - pyrazolo[3,2-c]-s-triazole. Compounds of Formulas I and Ia in which R is a substituted amino group are advantageously prepared by heating the appropriate 4-ethoxycarbonyl pyrazol-5-yl hydrazine with the appropriate isocyanate of the Formula RNCO in an inert solvent, isolating the product then ring closing with phosphorous oxychloride, and subsequently hydrolyzing the 4-ethoxycarbonyl group from the compound.

Compounds of Formulas I and Ia, where R is an alkylthio radical, and $R_1$ is a branched alkyl or aryl, may also be conveniently obtained by reacting an isothiocarbohydrazide hydrohalide exemplified by compounds of the formula

such as prepared with the corresponding thiocarbohydrazide and alkyl halide; with a keto ester of the formula $$R^1COCH_2COOR^7$$

at a temperature of about 75°–130° C. to directly obtain the bicyclic intermediate as follows:

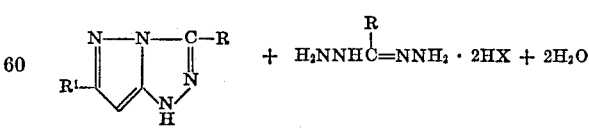

$+R^7OH$ wherein $R^7$ is defined as an alkyl group and X is an acid anion preferably a halide ion (Example: $I^-$, $Br^-$).

The above alternative reaction is more fully disclosed and claimed in our copending application entitled "Pyrazole[3,2-c]-s-Triazoles and Process for the Manufacture Thereof," U.S. Ser. No. 106,892, on January 15, 1971.

The term "a sensitizing amount," as herein used, has accepted meaning in the art, a convenient concentration range being about 40–1000 mg. of sensitizing dye/mold of silver.

The following examples are included for a further understanding of our invention.

EXAMPLE 1

7-(6-methyl-3-phenyl - 1H - pyrazolo[3,2-c]-s-triazol-7-ylidene)methylene-6-methyl - 3 - phenyl-1H-pyrazolo[3,2-c]-s-triazole 6-methyl-3-phenyl-1H-pyrazolo[3,2-c]-s-triazole (50 mg.) in acetic acid (2 cc.) is treated with ethyl orthoformate (0.5 cc.). Yellow dye immediately forms and on stirring the product, crystallizes. It is collected by filtration and washed with acetic acid. The dye is suspended in boiling ethanol and after cooling is collected by filtration and washed with ethanol. The yield of dye is almost theoretical. The dye is soluble in a mixture of ethanol and aqueous caustic soda. It has an absorption maximum in pyridine at 483 mµ. The dye sensitizes a silver chlorobromide emulsion out to 565 nm. with a peak at 450 nm. when utilized at a concentration of 200 mg./mole of silver.

The following dyes are prepared using procedures similar to that described in Example 1 with the appropriate intermediates:

7-(6-methyl-3-p-tolyl-1H-pyrazolo[3,2-c]-s-triazol-6-ylidene)methylene-6-methyl-3-p-tolyl-1H-pyrazolo[3,2-c]-s-triazole,
7-(6-methyl-3-n-propyl-1H-pyrazolo[3,2-c]-s-triazol-7-ylidene)methylene-6-methyl-3-n-propyl-1H-pyrazolo[3,2-c]-s-triazole,
7-(6-methyl-3-p-methoxyphenyl-1H-pyrazolo[3,2-c]-s-triazol-7-ylidene)methylene-6-methyl-3-p-methoxyphenyl-1H-pyrazolo[3,2-c]-s-triazole and
7-(6-methyl-3-(2,6-dichlorophenyl)-1H-pyrazolo[3,2-c]-s-triazol-7-ylidene)methylene-6-methyl-3-(2,6-dichlorophenyl)-1H-pyrazolo[3,2-c]-s-triazole.

EXAMPLE 2

7 - (3,6 - dimethyl - 1H - pyrazolo[3,2-c] - s - triazol-7 - ylidene) - 3' - allylidene - 3,6 - dimethyl - 1H-pyrazolo[3,2-c]-s-triazole 3,6-dimethyl - 1H - pyrazolo[3,2-c]-s-triazole (50 mg.) in acetic acid (2 cc.) is treated with β-ethoxyacrolein acetal (0.5 cc.). A magenta dye is formed immediately aand the mixture is warmed on the steam bath for two minutes and after cooling the dye precipitates by addition of ether. The product is collected by filtration and washed with ether. The yield is almost theoretical. The dye has an absorption maximum in methanol at 542 mµ and is bleached by a developer, such as, Kodak (a registered trademark) D19 Developer.

The following dyes are prepared using procedures similar to that described in Example 2 with the appropriate intermediates:

7-(6-methyl-3-phenyl-1H-pyrazolo[3,2-c]-s-triazol-7-ylidene)-3'-allylidene-6-methyl-3-phenyl-1H-pyrazolo[3,2-c]-s-triazole,
7-(6-methyl-3-p-tolyl-1H-pyrazolo[3,2-c]-s-triazol-7-ylidene)-3'-allylidene-6-methyl-3-p-tolyl-1H-pyrazolo[3,2-c]-s-triazole,
7-(6-methyl-3-n-propyl-1H-pyrazolo[3,2,-c]-s-triazol-7-ylidene)-3'-allylidene-6-methyl-3-n-propyl-1H-pyrazolo[3,2-c]-s-triazole and
7-(6-methyl-3-p-methoxyphenyl-1H-pyrazolo[3,2-c]-s-triazol-7-ylidene)-3'-allylidene-6-methyl-3-p-methoxyphenyl-1H-pyrazolo[3,2-c]-s-triazole.

EXAMPLE 3

7-(1,3 - diethyl - 4,6 - dioxo-hexahydro - 2 - thio - 5-pyrimidylidene) - 3' - allylidene - 3,6 - dimethyl-1H-pyrazolo[3,2-c]-s-triazole 3,6 - dimethyl - 1H - pyrazolo[3,2-c]-s-triazole (0.14 gram) and 1,3-diethyl - 4,6 - dioxo - 5 - (3-ethoxyallylidene)hexahydro - 2 - thiopyrimidine (0.28 gram) are warmed in ethanol (5 ml.) on a steam bath for 5 minutes and the magenta dye is precipitated by pouring into water (25 ml.). The product which is obtained in almost theoretical amount is collected and dried. It has an absorption maximum in methanol at 539 mµ.

The following dyes are prepared using procedures similare to that described in Example 3 with the appropriate intermediates.

7(1,3-diethyl-4,6-dioxo-hexahydro-2-thio-5-pyrimidylidene)3'-allylidene-6-methyl-3-phenyl-1H-pyrazolo[3,2-c]-s-triazole,
7(1,3-diethyl-4,6-dioxo-hexahydro-2-thio-5-pyrimidylidene)3'-allylidene-6-methyl-3-p-tolyl-1H-pyrazolo[3,2-c]-s-triazole,
7(3-phenyl-2-thio-4-oxo-5-thiazolidylidene)-3'-allylidene-6-methyl-3-p-methoxyphenyl-1H-pyrazolo[3,2-c]-s-triazole and
7(3-phenyl-2-thio-4-oxo-5-thiazolidylidene)-3'-allylidene-6-methyl-3-(2,6-dichlorophenyl)-1H-pyrazolo[3,2-c]-s-triazole.

EXAMPLE 4

3-ethyl-2-(3,6-dimethyl-1H-pyrazolo[3,2-c]-s-triazol-7-ylidene)-2'-ethylidenebenzthiazoline 3,6 - dimethyl - 1H - pyrazolo[3,2-c]-s-triazole (0.14 gram) 2-2'-acetanilido vinylbenzthiazole ethiodide (0.45 gram), triethylamine (0.5 ml.) and ethanol (25 ml.) are heated together on a steam bath for 10 minutes. After cooling, ether (50 ml.) is added and the product separates. The yield of dye is 0.1 gram. It has an absorption maximum in methanol a 494 mµ.

The following dyes are prepared using procedures similar to that described in Example 4 with the appropriate intermediates.

3-ethyl-2-(3,6-dimethyl-1H-pyrazolo[3,2-c]-s-triazol-7-ylidene)-2'-ethylidene-benzoselenazoline,
3-ethyl-2-(6-methyl-3-p-methoxyphenyl-1H-pyrazolo[3,2-c]-s-triazol-7-ylidene)-2'-ethylidene-benzothiazoline,
3-ethyl-2-(6-methyl-3-p-methoxyphenyl-1H-pyrazolo[3,2-c]-s-triazol-7-ylidene)-2'-ethylidene-benzoxazoline,
1,3-diethyl-2-(3,6-dimethyl-1H-pyrazolo[3,2-c]-s-triazol-7-ylidene)-2'-ethylidene-benzimidazoline and
1-ethyl-2-(3,6-dimethyl-1H-pyrazolo[3,2-c]-s-triazol-7-ylidene)-2'-ethylidene-1,2-dihydroquinoline.

EXAMPLE 5

1-ethyl - 2,5 - dimethyl - 3 - (3,6 - dimethyl - 1H - pyrazolo[3,2-c] - s - triazol - 7 - ylidene)methylene-pyrrole 3,6 - dimethyl - 1H - pyrazolo[3,2-c]-s-triazole (0.14 gram) 1-ethyl - 2,5 - dimethyl - 3 - pyrrole aldehyde (0.12 gram) and acetic acid (1 ml.) are warmed together on a steam bath for 5 minutes to give a yellow dye which is isolated by removing the acetic acid in vacuo. The dye has an absorption maximum in methanol at 436 mµ and is bleached by a developer, such as, Kodak D19 Developer.

The following dyes are prepared using procedures similar to that used in Example 5 with the appropriate intermediates.

1-ethyl-3,5-diphenyl-2-(3,6-dimethyl-1H-pyrazolo[3,2-c]-s-triazol-7-ylidene)methylene-pyrrole,
1-ethyl-3-methyl-2-(3,6-dimethyl-1H-pyrazolo[3,2-c]-s-triazol-7-ylidene)-methyleneindole,
1-ethyl-2-methyl-3-(3,6-dimethyl-1H-pyrazolo[3,2-c]-s-triazol-7-ylidene)methyleneindole,
1-ethyl-2,5-dimethyl-3-(6-methyl-3-phenyl-1H-pyrazolo[3,2-c]-s-triazol-7-ylidene)methylene-pyrrole,
1-ethyl-3,5-diphenyl-2-(6-methyl-3-phenyl-1H-pyrazolo[3,2-c]-s-triazol-7-ylidene)methylene-pyrrole, 1-ethyl-3-methyl-2-(6-methyl-3-phenyl-1H-pyrazolo[3,2-c]-s-triazol-7-ylidene)methyleneindole,
1-ethyl-2-methyl-3-(6-methyl-3-phenyl-1H-pyrazolo[3,2-c]-s-triazol-7-ylidene)methyleneindole, and
7-(6-methyl-3-phenyl-1H-pyrazolo[3,2-c]-s-triazol-7-ylidene)3'-allylidene-3,6-dimethyl-1H-pyrazolo[3,2-c]-s-triazole.

EXAMPLE 6

7 - (1,3 - diethyl - 4,6 - dioxo-hexahydro - 2 - thio - 5-pyrimidylidene) - 3' - allylidene - 3 - p-dimethylaminophenyl-6-methyl-1H-pyrazolo[3,2-c]-s-triazole The dye is prepared by the method of Example 3 using 3-(p-dimethylaminophenyl) - 6 - methyl - 1H - pyrazolo[3,2-c]-s-triazole instead of 3,6 - dimethyl-1H-pyrazolo[3,2-c]-s-triazole.

EXAMPLE 7

7-(1,3 - diethyl - 4,6-dioxo-hexahydro-2-thio-5-pyrimidylidene) - 3' - allylidene-3-(2,6-dichlorophenyl)-6-methyl-1H-pyrazolo[3,2-c]-s-triazole The dye is prepared by the method of Example 3 using 3-(2',6' - dichlorophenyl)-6-methyl-1H-pyrazolo[3,2-c]-s-triazole instead of 3,6-dimethyl - 1H - pyrazolo[3,2-c]-s-triazole.

EXAMPLE 8

3-ethyl-2-(6-methyl-3-phenyl-1H-pyrazolo[3,2-c]-s-triazole-7-ylidene)-2'-ethylidenebenzoxazoline 6-methyl - 3 - phenyl-1H-pyrazolo[3,2-c]-s-triazole (0.2 gram), 2-2'-acetanilidovinylbenzoxazole ethiodide (0.45 gram) and triethylamine (0.42 ml.) in ethanol (20 ml.) are heated together on a steam bath for 10 minutes. The mixture is cooled and diluted with water (10 ml.) to precipitate the product which is recrystallized from aqueous ethanol as orange crystals.

EXAMPLE 9

3-ethyl-2-(6-methyl-3-phenyl-1H-pyrazolo[3,2-c]-s-triazole-7-ylidene)-2'-ethylidenebenzthiazoline This compound is prepared from 6-methyl-3-phenyl-1H-pyrazolo[3,2-c]-s-triazole and 2-2'-acetanilidovinylbenzthiazole ethiodide in ethanol in the presence of triethylamine by the method of Example 4.

The product, which is isolated in the form of red platelets, sensitizes a silver chlorobromide emulsion out to 600 nm. with peaks at 510 and 560 nm.

EXAMPLE 10

5-(6-methyl-3-phenyl-1H-pyrazolo[3,2-c]-s-triazol-7-yl)methylene-3-phenyl-2-thiothiazolid-4-one 6 - methyl-3-phenyl-1H-pyrazolo[3,2-c]-s-triazole (0.2 gram), 5-ethoxymethylene - 3 - phenylrhodanine and triethylamine (0.42 ml.) in ethanol (20 ml.) are heated on a steam bath for 10 minutes and after cooling, the reaction mixture is acidified with dilute hydrochloric acid. The separated product is collected by filtration and recrystallized from benzene as yellow-orange needles.

The product sensitizes a silver chlorobromide emulsion out to 610 nm. with a peak at 570 nm.

The following dyes are prepared using procedures similar to that described in Example 10 with the appropriate intermediates.

5-(6-methyl-3-phenyl-7H-pyrazolo[3,2-c]-s-triazol-7-yl)methylene-1,3-diethyl-2-thiobarbituric acid
5-(3,6-dimethyl-1H-pyrazolo[3,2-c]-s-triazol-7-yl)methylene-1,3-diethyl-2-thiobarbituric acid and
5-(3,6-dimethyl-1H-pyrazolo[3,2-c]-s-triazol-7-yl)methylene-3-phenyl-2-thiothiazolid-4-one.

The following Examples 11 through 14 illustrate the reactions used to synthesize compounds of Formulas I and Ia used in Examples 1 through 10 above.

EXAMPLE 11

6-methyl-3-phenyl-1H-pyrazolo[3,2-c]-s-triazole

7 - ethoxycarbonyl-6-methyl-3-phenyl-1H-pyrazolo[3,2-c]-s-triazole (1 gram) and sulfuric acid (sp.gr. 1.84; 8 ml.) are warmed on steam bath at 60°–70° C. for 45 minutes. The clear reaction solution is cooled and poured into water (200 ml.). The thick colorless precipitate is collected by filtration, washed with sulfuric acid (3 N, 25 ml.) and then with water (50 ml.). The product is recrystallized from aqueous ethanol and obtained as buff needles. The yield is 0.4 gram (55%). $C_{11}H_{10}N_4$ requires 66.7% C; 5.1% H; 28.3% N; sample on analysis gives 66.8% C; 5.3% H; 27.85% N.

EXAMPLE 12

3-p-dimethylaminophenyl-6-methyl-1H-pyrazolo[3,2-c]-s-triazole

The method of preparation is similar to Example 11 using the appropriate intermediate. The intermediate used is prepared by reaction of p-dimethylaminobenzaldehyde with 4-ethoxycarbonyl - 3 - methylpyrazol-5-yl hydrazine and ring closure of the resulting hydrazone by mixing it with sodium acetate in acetic acid and adding to the mixture a solution of bromine in glacial acetic acid.

EXAMPLE 13

3,6-dimethyl-1H-pyrazolo[3,2-c]-s-triazole 4-ethoxycarbonyl-3-methylpyrazol - 5 - yl hydrazine [H. Beyer et al. Ber. 89, 2552 (1956)] (3.09 grams) is mixed with acetic acid (10 ml.) and acetic anhydride (1.5 ml.) and heated on steam bath for 1 hour. The solution is cooled, poured into water (50 ml.) and the crystalline acethydrazide is collected, after chilling overnight, washed with ice cold water and dried. The product which weighs 3.14 grams (98%) M.P. 130° C. is heated under reflux with dry benzene (125 ml.) and phosphorus oxychloride (2.7 ml.) for 4 hours and then stood overnight at room temperature. The benzene is removed by distillation and the residual oil is stirred with water (100 ml.). The mixture is extracted with ethyl acetate (3 × 150 ml.). The ethyl acetate solution is dried over calcium sulfate and then concentrated to dryness yielding a pale yellow solid which is recrystallized from ethanol. The product which weighs 2.05 grams and melts at 172°–3° C. is treated with concentrated sulfuric acid (16 ml.) and heated on a steam bath for 75 minutes. The solution is then cooled and poured into water (100 ml.) and, after chilling, is basified to pH 10 with 40% sodium hydroxide solution. The solution is extracted with ethyl acetate (3 × 150 ml.) and the organic layer separates, is dried over calcium sulfate and, after removing the solvent by distillation, a pale yellow solid is obtained. The product weighs 1.1 grams and melts at 190° C.

EXAMPLE 14

3-(2,6-dichlorophenyl)-6-methyl-1H-pyrazolo[3,2-c]-s-triazole-7-carboxylic acid

This compound is synthesized by adding a solution of bromine in glacial acetic acid to a mixture of 2,6-dichlorobenzaldehyde 4-ethoxycarbonyl-3-phenylpyrazol-5-yl hydrazone and sodium acetate in acetic acid. The 2,6-dichlorobenzaldehyde 4 - ethoxycarbonyl-3-phenylpyrazol-5-yl hydrazone is advantageously produced by reacting 4-ethoxycarbonyl-3-phenylpyrazol-5-yl hydrazine with 2,6-dichlorobenzaldehyde.

Additional precursor compounds suitable for obtaining the dyes of Formulae III–VIII (supra) may be produced as follows:

EXAMPLE 15

3-methylthio-6-phenyl-1H-pyrazolo[3,2-c]-s-triazole (Compound 15)

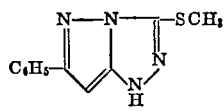

Ethyl benzoylacetate (9.6 grams) and S-methyl isothiocarbohydrazide hydroiodide (12.4 grams) were heated together at 110°–115° C. for 25 minutes. During the last 5 minutes of the heating the volatile reactants were distilled off in vacuo. The reaction mixture was cooled and then heated with sufficient boiling 10% sodium carbonate solution (about 300 ml.) to effect solution of most of the reaction mass. A small amount of oily residue remained which was removed by filtration. On cooling the hot clear carbonate solution the product crystallized and was collected by filtration. It was recrystallized from benzene as tiny buff-colored needles. The yield of product which melted at 179° C. was 5 grams. It coupled with oxidized 2-amino-5-diethylaminotoluene developer to give a dye which had $\lambda_{max}$ ethyl acetate at 565 nm. The S-methyl isothiocarbohydrazide hydroiodide was prepared by adding methyl iodide (18 grams) to a well stirred suspension of thiocarbohydrazide (12 grams) in boiling ethanol (400 ml.) and heating under reflux for 2 hours. The product was isolated by cooling the hot filtered solution and collection of the separated product by filtration. Concentration of the ethanol solution to about half volume gave a second crop. The yield of colorless crystals was 70%. The product melted at 145° (with decomposition).

EXAMPLE 16

3-methylthio-6-m'-nitrophenyl-1H-pyrazolo[3,2-c]-s-triazole

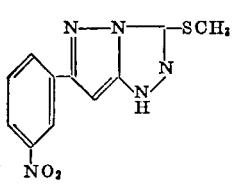

Ethyl m-nitrobenzoyl acetate (2.4 grams) and S-methyl isothiocarbohydrazide hydroiodide (2.5 grams) were heated at 120° C. for 15 minutes. The reaction mass was treated with carbonate solution as described in the previous example. The dark yellow solid product, which separated was collected, melted at 214°–217° C. and coupled with oxidized 2-amino-5-diethylaminotoluene to give a dye having $\lambda_{max}$ ethyl acetate at 585 nm.

EXAMPLE 17

6-heptadecyl-3-methylthio-1H-pyrazolo[3,2-c]-s-triazole

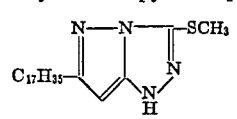

A solution of ethyl stearoylacetate (2.1 grams) and S-methyl isothiocarbohydrazide hydroiodide (1.6 grams) in n-amyl alcohol (25 ml.) was heated under reflux for 2 hours. On cooling some solid material separated and was collected by filtration. Ether was added to the amyl alcohol solution to precipitate more solid material which was also filtered off. Neither solid coupled with oxidized developers. The solution was concentrated to leave an oil which was treated with benzene (100 ml.) and the solvent again removed. The residual gum (2 grams) coupled with oxidized 2-amino-5-diethylamino toluene developer to give a dye having $\lambda_{max}$ ethyl acetate at 541 nm.

EXAMPLE 18

3-methylthio-6-p-nitrophenyl-1H-pyrazolo[3,2-c]-s-triazole

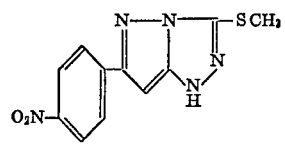

Ethyl p-nitrobenzoylacetate (2.26 grams) and S-methylisothiocarbohydrazide hydroiodide (2.36 grams) were heated in boiling amyl alcohol (40 cc.) for 35 minutes. The reaction mixture was cooled and the product which precipitated as yellow crystals was collected by filtration and recrystallized from amyl alcohol. The purified product was collected, washed with ethanol and dried. The yield of product was melted at 277° C. was 1 gram. It coupled with oxidized 2-amino-5-diethylaminotoluene developer to give a dye with $\lambda_{max}$ ethyl acetate at 588 nm.

EXAMPLE 19

3-methylthio-6-propyl-1H-pyrazolo[3,2-c]-s-triazole

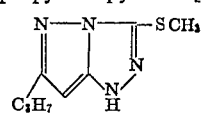

This compound was prepared similarly to Example 17 using a proportionate amount of ethyl butyrylacetate instead of ethyl stearoylacetate. The product which was obtained as a gum coupled with oxidized 2-amino-5-diethylaminotoluene developer to give a dye with $\lambda_{max}$ ethyl acetate at 541 nm.

EXAMPLE 20

6,2'-furyl-3-methylthio-1H-pyrazolo[3,2-c]-s-triazole

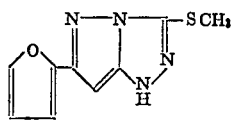

This compound was prepared as Example 17 using ethyl-2-furoylacetate instead of ethyl stearoylacetate. The product which was obtained as a gum coupled with oxidized 2-amino-5-diethylaminotoluene developer to give a dye having $\lambda_{max}$ ethyl acetate at 567 nm.

EXAMPLE 21

3,6-di(methylthio)-1H-pyrazolo[3,2-c]-s-triazole

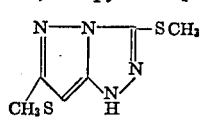

EXAMPLE 22

7-bromo-3-methylthio-6-phenyl-1H-pyrazolo[3,2-c]-s-triazole

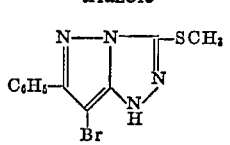

Compound 15 (1 gram), sodium acetate (0.42 gram) were dissolved in acetic acid (30 ml.) and the solution was treated with bromine (0.8 gram) in acetic acid (4 ml.) portionwise. The mixture was allowed to stand at room temperature for 40 minutes and then heated on a steam bath for 20 minutes, after which it was cooled back to room temperature and poured into water (150 ml.) The precipitated product was collected by filtration, washed with water and dried. It weighed 1.1 grams, melted at 152°–153° and coupled with oxidized 2-amino-5-diethylamino toluene developer to give a magenta dye.

EXAMPLE 23

7-chloro-3-methylthio-6-phenyl-1H-pyrazolo[3,2-c]-s-triazole

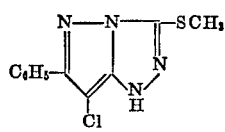

Compound 15 (1 gram) was dissolved in acetic acid (15 ml.) and sulphuryl chloride (0.65 gram) were slowly added to the solution, the mixture was heated on the steam bath for 5 minutes and allowed to stand at room temperature for 1 hour. The mixture was then poured into water (200 ml.) and the precipitated product was collected by filtration and dried. It weighed 0.9 gram and melted at 150°.

EXAMPLE 24

7 - (3 - methylthio-6-phenyl-7H-pyrazolo[3,2-c]-s-triazol-7 - ylidene)-methylene-3-methylthio-6-phenyl-1H-pyrazolo[3,2-c]-s-triazole

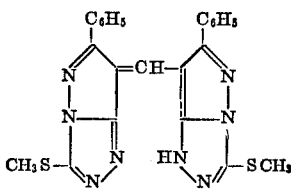

Compound 15 (0.1 gram), ethylorthoformate (1 ml.) and acetic acid (4 ml.) were heated at boiling point for 5 minutes. The product which crystallized from the hot reaction mixture was isolated after cooling by filtration. It was washed with ethanol, dried and obtained in almost theoretical amount. It has an absorption maximum in methanol in the presence of triethylamine at 494 nm.

EXAMPLE 25

7,3' - (3 - methylthio-6-phenyl-7H-pyrazolo[3,2-c]-s-triazol - 7 - ylidene)allylidene-3-methylthio-6-phenyl-1H-pyrazole[3,2-c]-s-triazole (Compound 25)

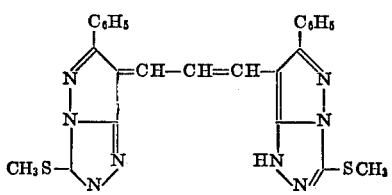

A solution of Compound 15 (0.23 gram) and 1,1,3-trimethoxy-3-ethoxypropane (0.2 ml.) in acetic acid (5 ml.) was heated under reflux for 2 minutes. The solid dye product separated from solution and after cooling it was collected and recrystallized in almost quantitative yield from methanol. The product was obtained as dark green metallic crystals $\lambda_{max}$ methanol at 554 nm.

EXAMPLE 26

3-ethyl-2-(3-methylthio-6-phenyl-7H-pyrazolo[3,2-c]-s-triazole-7-ylidene)benzthiazoline (Compound 26)

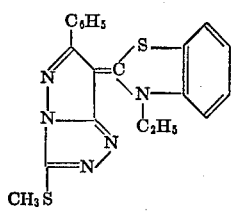

Compound 15 (0.23 gram), 2 - ethylthiobenzthiazole ethiodide (0.34 gram), triethylamine (0.5 ml.) and ethanol (5 ml.) were heated under reflux for 10 mins. After chilling the reaction mixture, the separated dye was collected and recrystallized from ethanol as pale yellow crystals. It weighed 0.1 gram and had $\lambda_{max}$ methanol at 410 nm.

EXAMPLE 27

3-methylthio-7-p-nitrobenzylidene-6-phenyl-7H-pyrazolo[3,2-c]-s-triazole

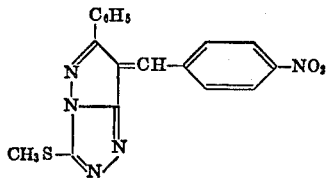

Compound 15 (0.23 gram), p-nitrobenzaldehyde and acetic acid (5 ml.) were heated under reflux for 10 mins. After cooling the product was precipitated by dilution with water (25 ml.) and collected by filtration. It was twice recrystallized from ethanol and obtained in 20% as pale yellow crystals. It coupled with oxidized 2-amino-5-diethylamino toluene developer to give a dye $\lambda_{max}$ ethyl acetate at 566 nm.

EXAMPLE 28

7-(1-ethyl-2,5-dimethyl-3-pyrryl)methylene-3-methylthio-6-phenyl-7H-pyrazolo[3,2-c]-s-triazole

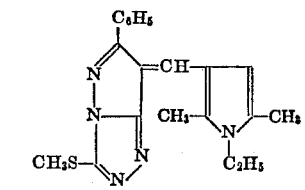

Compound 15 (0.46 gram), 1-ethyl-2,5-dimethylpyrrol-3-aldehyde (0.3 gram) were dissolved in boiling ethanol (10 ml.) and triethylamine (1 ml.) was added and the solution was refluxed for 10 minutes. The solution was concentrated to 5 ml. and well chilled when the dye product (0.25 gram) separated. It was twice recrystallized from methanol giving 0.15 gram orange needles. The dye has $\lambda_{max}$ methanol at 447 nm.

EXAMPLE 29

5 - (3 - methylthio-6-phenyl-1H-pyrazolo[3,2-c]-s-triazol-7 - yl)methylene-3-phenyl-2-thiothiazolid-4-one (Compound 29)

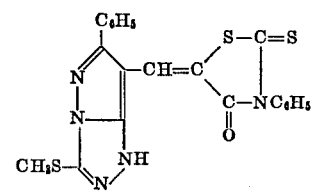

A mixture of Compound 15 (0.23 gram), 5-ethoxymethylene-3-phenylrhodanine (0.26 gram), triethylamine (0.42 ml.) and ethanol (20 ml.) was heated under reflux for 10 minutes. About half the ethanol was removed by distillation, water (10 ml.) added, and the mixture made slightly acid with hydrochloric acid. The dye precipitated as a gum which rapidly hardened. After collection by filtration the product was recrystallized from a mixture of benzene and petroleum ether. The dye which was obtained in 55% yield had $\lambda_{max}$ methanol at 495 nm.

EXAMPLE 30

3-ethyl-2,2'-(3-methylthio-6-phenyl-1H - pyrazolo[3,2-c]-s-triazole-7 - ylidene)ethylidenebenzoxazoline (Compound 30)

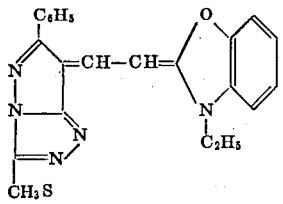

A mixture of Compound 15 (.23 gram) 2,2'-acetanilidovinylbenzoxazole ethiodide (0.45 gram), triethylamine (0.42 ml.) and ethanol (20 ml.) was heated under reflux for 10 minutes. Water (20 ml.) was added to the cooled reaction solution and the product which was obtained in almost quantitative yield was recrystallized from methanol as yellow crystals having $\lambda_{max.}$ methanol at 480 nm.

EXAMPLE 31

3-ethyl-2,2' - (3-methylthio-6-phenyl-7H-pyrazolo[3,2-c]-s-triazol-7 - ylidene)ethylidenebenzthiazoline (Compound 31)

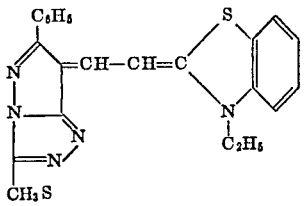

Compound 15 (0.46 gram) 2,2'-acetanilidovinylbenzthiazole ethiodide (0.9 gram), triethylamine (1 ml.) and ethanol (30 ml.) were heated together on a steam bath for 10 minutes. The reaction mixture was cooled and the separated product was collected by filtration. It was recrystallized twice from methanol. The purified product weighed 0.2 gram and has $\lambda_{max.}$ methanol at 521 nm.

EXAMPLE 32

7,3'-(1,3-diethyl - 4,6-dioxo-hexahydro-2-thiopyrimid-5-ylidene)allylidene - 3-methylthio-6-phenyl-1H-pyrazolo[3,2-c]-s-triazole

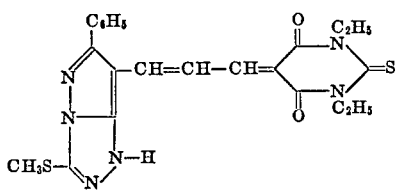

Compound 15 (0.46 gram) and 1,3-diethyl-4,6-dioxo-5-(3-ethoxyallylidene)hexahydro-2-thiopyrimidine (0.56 gram) were dissolved in boiling ethanol (20 ml.) and the mixture was refluxed for 10 minutes. The reaction mixture was cooled and the dye was collected by filtration. The product was purified by dissolving it in hot pyridine and reprecipitating by the addition of ethanol to the cooled pyridine solution. The product which weighed 0.4 gram had $\lambda_{max.}$ methanol at 535 nm. and 561 nm.

EXAMPLE 33

3-ethyl-2,4' - (3-methylthio-6-phenyl-7H-pyrazolo[3,2-c]-s-triazol - 7-ylidene) but-2' - enylidenebenzthiazoline (Compound 33)

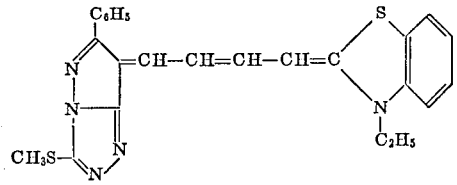

Compound 15 (0.46 gram), 2,4'-acetanilidobutadienylbenzthiazole ethiodide (0.95 gram) were dissolved in boiling ethanol (70 ml.). Triethylamine (1 ml.) was added and a deep blue dye was formed. The mixture was heated under reflux for 5 minutes and on chilling dark blue needles separated. The product (0.6 gram) was collected and recrystallized twice from methanol. The dye had $\lambda_{max.}$ methanol at 619 nm.

EXAMPLE 34

A sensitizing amount (i.e. 200 mg./mole of silver) of each of dye compounds 25, 30, 29, 31, 26 and 33 indicated in the table below was added to separate portions of a negative-type, developing out gelatino silver chlorobromide emulsion. Each of these emulsions was coated onto a piece of cellulose ester film support and dried. Spectrographic exposures were made on each coating and these were developed in a photographic developer having the following compositions:

| | Garms |
|---|---|
| p-Methylaminophenol sulphate | 2.0 |
| Sodium sulphite desiccated | 90.0 |
| Hydroquinone | 8.0 |
| Sodium carbonate monohydrate | 52.5 |
| Potassium bromide | 5.0 |
| Water to make 1 liter. | | fixed in a conventional sodium thiosulphate fixing bath, washed, and dried. The following table summarizes the wavelength of light to which the maximum sensitivity is produced, and the longest wavelength light to which each emulsion is sensitized.

| | Wavelength of light in nm. to which— | |
|---|---|---|
| | (i) Dye produces max. sensitivity | (ii) Dye sensitizes emulsion at— |
| Compound No.: | | |
| 25 | 590 | 650 |
| 30 | 510 | 570 |
| 29 | 540 | 620 |
| 31 | 510 | 580 |
| 26 | 550 | 640 |
| 33 | 580 | 640 |

EXAMPLE 35

6-heptadecyl-3-methylthio-1H - pyrazolo[3,2-c]-s-triazole (0.2 gram) was dissolved in dibutyl phthalate (0.4 ml.) at 80° C. A hot solution (80° C.) of 10% inert bone gelatin (12.8 ml.) and 5% tri-isopropylnaphthalene sulphonate (1.2 ml.) were added to the coupler solution and the mixture was homogenized using an ultrasonic probe. Water (8.8 ml.) and 7.5% solution of saponin (0.9 ml.) were added and the mixture was filtered. A gelatino bromoiodide emulsion (6.8 grams containing 0.69 gram silver) was added to the filtrate and the mixture was coated on a cellulose acetate film base at 425 m. gelatin/sq. ft. dry weight and the light-sensitive material so obtained was exposed and then developed for 10 minutes at 58° F. in a color developer of the following composition:

| | |
|---|---|
| Water ml | 800 |
| Anhydrous sodium sulphite gr | 2.0 |
| 2-amino-5-diethylamino-toluene hydrochloride gr | 2.0 |
| Sodium carbonate monohydrate gr | 20.0 |
| Sodium bromide gr | 1.73 |

Water to make 1,000 ml. and pH adjusted to 10.9 (22° C.).

The development was followed by acid stop-fix, ferricyanide bleach and finally fixation stages when a magenta image was formed in the exposed regions by the formation of a dye having an absorption maximum at 559 nm. Other developing agents can be used for example, 3-methyl-4-amino-N-$\beta$ - methyl - sulphonamidoethyl-N-ethylaniline gives a dye with absorption maximum at 555 nm.

Example 36

A color developer solution having the formula:

| | Grams |
|---|---|
| Sodium sulphite | 2 |
| 2-amino-5-diethylamino toluene hydrochloride | 2 |
| Sodium carbonate | 20 |
| Potassium bromide | 2 |
| Compound 5 (in ethanol sufficient to dissolve coupler | 1.5 |

Water to 1 liter.

pH adjusted to 11.5 with sodium hydroxide solution was used to color develop a magenta image in a strip of image exposed film coated with a layer of silver halide emulsion. The silver in the strip was converted to silver halide by treating it with a ferricyanidebromide bleach and then the silver halide was removed by treating the strip with a hypofix bath to leave a magenta dye image having an absorption maximum at 557 nm. A magenta dye image having an absorption maximum at 570 nm. was obtained when 3-methylthio-6-phenyl-H - pyrazolo[3,2-c] - s-triazole (Compound 15) is used as the coupler and N,N-diethyl-p-phenylenediamine as the developing agent in the above formula.

Our dyes, especially those of Formulas III, VI and VIII are used advantageously as spectral sensitizers for photographic silver halide emulsions when incorporated therein. Dyes of Formula IV are used to advantage in hydrophilic colloid light-absorbing filter layers for photographic elements. These dyes are bleached by the action of conventional developer solutions.

The sensitizing dyes of our invention are especially useful for extending the spectral sensitivity of the customarily employed silver chloride, silver chlorobromide, silver bromide, silver bromoiodide and silver chlorobromoiodide developing out emulsions using a hydrophilic colloid carrier such as gelatin, its water-soluble derivatives, polyvinyl alcohol, its water soluble derivatives and copolymers, water-soluble vinyl polymers, such as polyacrylamide, imidized polyacrylamide, etc., and other water-soluble film-forming materials that form water-permeable coatings, such as colloidal alubumin, water-soluble cellulose derivatives like ethanolamine cellulose acetate, etc. To prepare emulsions sensitized with one or more of our new dyes, it is only necessary to disperse the dye or dyes in the emulsions. The methods of incorporating dyes in emulsions are simple and well known to those skilled in the art. In practice, it is convenient to add the dyes to the emulsion in the form of a solution in a suitable solvent. Methanol, ethanol, propanol, etc., acetone and pyridine are used to advantage. The dyes are advantageously incorporated in the finished, washed emulsions, and should be uniformly distributed throughout the emulsions.

The concentration of the dyes in the emulsions can vary widely, and will depend upon the type of emulsion and the effect desired. The suitable and most economical concentration for any given emulsion will be apparent to those skilled in the art, upon making the ordinary tests and observations customarily used in the art of emulsion making.

To prepare a hydrophilic colloid-silver halide emulsion sensitized with one or more of our new dyes, the following procedure is satisfactory. A quantity of dye is dissolved in a suitable solvent, such as an alcohol, acetone, pyridine, etc., and a volume of this solution, which may be diluted with water, containing the dye, is slowly added to about 1000 cc. of gelatino-silver halide emulsion, with stirring. Stirring is continued until the dye is uniformly dispersed in the emulsion.

The above statements are only illustrative, as it will be apparent that the dyes can be incorporated in photographic emulsions by any of the other methods customarily employed in the art, e.g., by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

EXAMPLE 37

A sensitizing amount of each of the dyes indicated in the table below is added to separate portions of an ordinary gelatino silver chlorobromide emulsion. Each of these emulsions is coated on a piece of cellulose ester support and dried. Spectrographic exposures are made at $\frac{1}{25}$ second on each coating and these are developed at room temperature in a photographic developer having the composition:

| | Grams |
|---|---|
| p-Methylaminophenol sulfate | 2.0 |
| Sodium sulfite, desiccated | 90.0 |
| Hydroquinone | 8.0 |
| Sodium carbonate·$H_2O$ | 52.5 |
| Potassium bromide | 5.0 |

Water to make 1 liter.

fixed in a conventional sodium thiosulfate fixing bath, washed and dried. The following table summarizes the wavelength of light to which the maximum sensitivity is produced and the longest wavelength light to which each emulsion is sensitized.

| | | Wavelength of light in nm. to which— | |
|---|---|---|---|
| Dye of Example | Silver halide in emulsion | Dye produces max. sensitivity | Dye sensitizes emulsion |
| 1 | Silver chlorobromide | 450 | 565 |
| 3 | do | 600 | 480–640 |
| 4 | do | 500 | 610 |
| 6 | do | 580 | 640 |
| 7 | do | 580 | 510–620 |
| 8[1] | do | 510 | 545 |
| 9 | do | 510 & 560 | 600 |
| 10 | do | 570 | 610 |

[1] In the presence of Leucophor B (a registered trademark) brighteners

Similar results are obtained when Example 15 is repeated using other silver halide emulsions. Similarly it can be shown that other of our dyes such as those listed immediately after Examples 1, 3, 4, and 10 are valuable spectral sensitizers for photographic silver halide emulsions.

Our novel spectrally sensitized silver halide emulsions are advantageously used in making color photographic elements that are color developed with color developers that contain the color-forming couplers or used in making color photographic elements that incorporate the color-forming couplers in the emulsions. Any of the cyan, yellow and magenta dye-forming couplers used in color photography are used to advantage to form a dye image in our emulsions.

EXAMPLE 38

A batch of aqueous gelatin is divided into 6 portions to which samples of the dyes of Examples 1, 2, 3, 5, 25, and 28 are added. The dye of Example 1 is added in pyridine solution while the dyes of Examples 2, 3, 5, 25, and 28 are added in methanol solution. The dyed portions of aqueous gelatin are coated on pieces of film support as useful filter layers for photographic elements.

The invention has been described in detail with particular reference to certain preferred embodiments thereof, but it will be understood that variations and modifications can be effected within the spirit and scope of the invention.

We claim:

1. A photographic element comprising a support containing coated thereon, at least one light-sensitive hydrophilic colloid emulsion layer and at least one layer containing a filter dye having the formula:

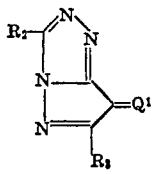

wherein $R_2$ and $R_3$ each represent a member selected from the class consisting of hydrogen, alkyl, aryl, heterocyclic, amino, acylamido, hydroxyl, alkoxyl, carboxy, and esterified carboxy groups, and $Q^1$ represents a

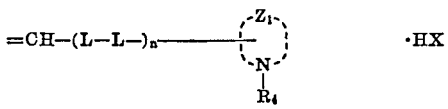

in which $R_4$ is an alkyl or a phenyl group; L is defined as a methine group; $n$ is an integer of from 0 to 2; $Z_1$ represents the atoms necessary to complete a heterocyclic basic nucleus having from 5 to 6 atoms in the heterocyclic ring; and X represents an acid anion.

2. A photographic element as in claim 1, wherein said light-sensitive hydrophilic colloid emulsion layer contains said filter dye.

3. A photographic element as in claim 1, wherein said layer containing said filter dye and said emulsion layer differ.

4. A photographic element as in claim 2, wherein said filter dye is 1 - ethyl - 2,5 - dimethyl-3-(3,6-dimethyl-1H-pyrazolo[3,2-c]-s-triazol-7-ylidene)methylenepyrrole.

5. A photographic element as in claim 3, wherein said filter dye is 1 - ethyl - 2,5-dimethyl-3-(3,6-dimethyl-1H-pyrazolo[3,2-c]-s-triazol-7-ylidene)methylenepyrrole.

6. A photographic element as in claim 2, wherein said filter dye is 1 - ethyl - 3,5 - diphenyl-2-(3,6-dimethyl-1H-pyrazolo[3,2-c]-s-triazol-7-ylidene)methylenepyrrole.

7. A photographic element as in claim 3, wherein said filter dye is 1 - ethyl - 3,5 - diphenyl-2-(3,6-dimethyl-1H-pyrazolo[3,2-c]-s-triazol-7-ylidene)methylenepyrrole.

8. A photographic element as in claim 2, wherein said filter dye is 1 - ethyl - 3 - methyl-2-[3,6-dimethyl-1H-pyrazolo[3,2-c]-s-triazol-7-ylidene)methyleneindole.

9. A photographic element as in claim 3, wherein said filter dye is 1 - ethyl - 3 - methyl-2-(3,6-dimethyl-1H-pyrazolo[3,2-c]-s-triazol-7-ylidene)methyleneindole.

10. A photographic element as in claim 2, wherein said filter dye is 1 - ethyl - 2-methyl-3-(3,6-dimethyl-1H-pyrazolo-[3,2-c]-s-triazol-7-vadene)methyleneindole.

11. A photographic element as in claim 3, wherein said filter dye is 1 - ethyl - 2 - methyl-3-(3,6-dimethyl-1H-pyrazolo[3,2-c]-s-triazol-7-ylidene)methyleneindole.

12. A photographic element as in claim 2, wherein said filter dye is 1-ethyl-2,5-dimethyl-3-(6-methyl-3-phenyl - 1H-pyrazolo[3,2-c]-s-triazol-7-ylidene)methylenepyrrole.

13. A photographic element as in claim 3, wherein said filter dye is 1-ethyl-2,5-dimethyl-3-(6-methyl-3-phenyl-1H-pyrazolo[3,2-c]-s-triazol-7-ylidene)methylenepyrrole.

14. A photographic element as in claim 2, wherein said filter dye is 1-ethyl-3,5-diphenyl-2-(6-methyl-3-phenyl - 1H-pyrazolo[3,2-c]-s-triazol-7-ylidene)methylenepyrrole.

15. A photographic element as in claim 3, wherein said filter dye is 1 - ethyl - 3,5-diphenyl-2-(6-methyl-3-phenyl - 1H - pyrazolo[3,2-c]-s-triazol-7-ylidene)methylenepyrrole.

16. A photographic element as in claim 2, wherein said filter dye is 1 - ethyl-3-methyl-2-(6-methyl-3-phenyl-1H - pyrazolo[3,2-c]-s-triazol-7-ylidene)methyleneindole.

17. A photographic element as in claim 3, wherein said filter dye is 1-ethyl-3-methyl-2-(6-methyl-3-phenyl-1H - pyrazolo[3,2-c]-s-triazol-7-ylidene)methyleneindole.

18. A photographic element as in claim 2, wherein said filter dye is 1-ethyl-2-methyl-3-(6-methyl-3-phenyl-1H-pyrazolo[3,2-c]-s-triazol-7-ylidene)methyleneindole.

19. A photographic element as in claim 3, wherein said filter dye is 1-ethyl-2-methyl-3-(6-methyl-3-phenyl-1H - pyrazolo[3,2-c]-s-triazol-7-ylidene)methyleneindole.

References Cited

UNITED STATES PATENTS

| | | | |
|---|---|---|---|
| 3,758,309 | 9/1973 | Bailey et al. | 96—89 R |
| 3,615,639 | 10/1971 | Carpenter et al. | 96—101 |
| 2,887,480 | 5/1929 | Webster et al. | 96—132 |
| 3,598,595 | 8/1971 | Mee et al. | 96—132 |

NORMAN G. TORCHIN, Primary Examiner

E. C. KIMLIN, Assistant Examiner

U.S. Cl. X.R.

96—100, 130, 132, 133, 141, 143; 260—240, 240.4, 240.6, 240.7

PO-1050
(5/69)

UNITED STATES PATENT OFFICE
CERTIFICATE OF CORRECTION

Patent No. 3,810,761      Dated May 14, 1974

Inventor(s) Joseph Bailey, Edward B. Knott and Peter A. Marr

It is certified that error appears in the above-identified patent and that said Letters Patent are hereby corrected as shown below:

Page 1

Column 1, line 37, "sensitizer" should read ---sensitizers---;

Column 1, line 53, after "coated", "the" should be deleted;

Column 3, lines 5-6, that part of the formula reading "sulfobenzamino" should read ---sulfobenzamido---;

Column 3, after line 24, the first line of the paragraph before the formulae should read ---Our dyes are demonstrated by the formulae:---;

Column 3, line 40, that part of the formula reading:

" - H=(L "     should read      --- -CH=(L ---;

Column 4, line 29, "7-chlorobenothiazole" should read --- 7-chlorobenzothiazole---;

Column 5, line 25, "or" should read ---of---;

Column 6, line 20, that part of the formula reading "triazolo" should read ---triazole---;

Column 8, line 32, "a" should read ---at---;

Column 12, line 18, after "product", "was" should read ---which---;

Column 12, line 54, after the formula, the following paragraph should be inserted: --- O-ethyl-S-methyl assymmetric diethiomalonate (1.78 grams) (Laakso, Suomen Kemistilehte, 1944, 17B, 1-6) and S-methyl isothiocarbo-
(continued on next page)

UNITED STATES PATENT OFFICE
CERTIFICATE OF CORRECTION

Patent No. 3,810,761  Dated May 14, 1974

Inventor(s) Joseph Bailey, Edward B. Knott and Peter A. Marr

It is certified that error appears in the above-identified patent and that said Letters Patent are hereby corrected as shown below:

Page 2 hydrazide (2.36 grams) were heated in boiling amyl alcohol (25 ml.) for 30 minutes and worked up as in Example 3. The product which was obtained as a gum coupled with oxidized 2-amino-5-diethylamino toluene developer to give a dye having λmax ethyl acetate at 533 nm.---;

Column 13, line 42, that part of the formula reading "pyrazole" should read ---pyrazolo---;

Column 13, line 63-65, that part of the formula reading:

Column 17, line 1, "58?" should read ---68°---;

Column 17, line 40, that part of the formula reading "-H-" should read --- -1H- ---;

Column 19, line 16, before "coated", ---,--- should be inserted;

Column 20, line 4, that part of the formula reading "[3,6" should read ---(3,6---;

Column 20, line 11, that part of the formula reading "vadene" should read ---ylidene---;

Signed and sealed this 7th day of January 1975.

(SEAL)
Attest:

McCOY M. GIBSON JR.  
Attesting Officer

C. MARSHALL DANN  
Commissioner of Patents